United States Patent
Huang et al.

(10) Patent No.: US 9,810,278 B2
(45) Date of Patent: Nov. 7, 2017

(54) LEAF SPRING, LEAF SPRING GROUP, AND COMPRESSOR

(71) Applicant: Green Refrigeration Equipment Engineering Research Center of Zhuhai Gree Co., Ltd., Zhuhai, Guangdong (CN)

(72) Inventors: Hui Huang, Guangdong (CN); Yusheng Hu, Guangdong (CN); Huijun Wei, Guangdong (CN); Zhong Cui, Guangdong (CN); Jianping Huang, Guangdong (CN); Chuanshun Huang, Guangdong (CN); Zhujin Chen, Guangdong (CN); Yiming Liang, Guangdong (CN)

(73) Assignee: Green Refrigeration Equipment Engineering Research Center of Zhuhai Gree Co., Ltd. (CN)

( * ) Notice: Subject to any disclaimer, the term of this patent is extended or adjusted under 35 U.S.C. 154(b) by 0 days.

(21) Appl. No.: 15/026,012

(22) PCT Filed: Sep. 5, 2014

(86) PCT No.: PCT/CN2014/086056
§ 371 (c)(1),
(2) Date: Jun. 22, 2016

(87) PCT Pub. No.: WO2015/043371
PCT Pub. Date: Apr. 2, 2015

(65) Prior Publication Data
US 2016/0290427 A1 Oct. 6, 2016

(30) Foreign Application Priority Data
Sep. 30, 2013 (CN) .......................... 2013 1 0459756

(51) Int. Cl.
*F16F 1/02* (2006.01)
*F16F 1/18* (2006.01)
(Continued)

(52) U.S. Cl.
CPC .............. *F16F 1/185* (2013.01); *F16F 1/027* (2013.01); *F16F 3/00* (2013.01); *F16F 3/023* (2013.01)

(58) Field of Classification Search
CPC .... F16F 1/185; F16F 1/027; F16F 3/00; F16F 3/023
(Continued)

(56) References Cited

U.S. PATENT DOCUMENTS 5,351,490 A * 10/1994 Ohishi .................. F04B 35/045
267/161
5,522,214 A * 6/1996 Beckett ................. F02G 1/0435
267/161
(Continued)

FOREIGN PATENT DOCUMENTS

CN 2675950 2/2005
CN 201198826 2/2009
(Continued)

*Primary Examiner* — Thomas Irvin
(74) *Attorney, Agent, or Firm* — Colin P. Cahoon; Shaukat A. Karjeker; Carstens & Cahoon, LLP

(57) ABSTRACT

A leaf spring (100) comprises at least two spring arms (120, 130) and an inner fixing hole (110). The at least two spring arms (120, 130) are evenly distributed around a center of the inner fixing hole (110); each spring arm is of the same structure, and an outer fixing hole (122) is disposed at an outermost end of each spring arm. Further provided are a leaf spring group and a compressor. The leaf spring group comprises multiple leaf springs, and the compressor comprises the leaf spring group. The provided leaf spring has a structure of multiple concentric circular arms or a structure of concentric vortex arms, and the leaf spring has smaller (Continued)

equivalent mass, so that the rigidity and inherent frequency requirements can be met without the need of increasing the mass of the components, thereby reducing the product mass and saving the cost.

9 Claims, 5 Drawing Sheets

(51) Int. Cl.
*F16F 3/00* (2006.01)
*F16F 3/02* (2006.01)

(58) Field of Classification Search
USPC .................................. 267/161, 162, 167, 272
See application file for complete search history.

(56) References Cited

U.S. PATENT DOCUMENTS

| | | | | |
|---|---|---|---|---|
| 5,525,845 | A * | 6/1996 | Beale | F02G 1/0435 310/12.27 |
| 6,050,556 | A * | 4/2000 | Masuda | F04B 35/045 188/378 |
| 6,056,519 | A * | 5/2000 | Morita | F04B 39/0027 267/161 |
| 7,078,832 | B2 * | 7/2006 | Inagaki | F04B 35/045 310/12.19 |
| 7,367,786 | B2 * | 5/2008 | Kang | F04B 35/045 417/417 |
| 7,614,856 | B2 * | 11/2009 | Inagaki | F04B 35/045 267/136 |
| 8,960,655 | B2 * | 2/2015 | Wood | F16F 1/027 267/159 |
| 2009/0007560 | A1 * | 1/2009 | Inoshiri | F16F 1/326 60/517 |
| 2014/0008557 | A1 * | 1/2014 | Vandamme | F16F 1/027 251/129.15 |
| 2016/0102724 | A1 * | 4/2016 | Potter | F16F 1/027 267/161 |

FOREIGN PATENT DOCUMENTS

| | | |
|---|---|---|
| CN | 103256203 A | 8/2013 |
| EP | 0909895 A2 | 4/1999 |
| EP | 1167765 A2 | 1/2002 |
| EP | 1780440 A1 | 5/2007 |
| JP | 2003247580 | 9/2003 |
| WO | 2006013377 A1 | 2/2006 |

* cited by examiner

LEAF SPRING, LEAF SPRING GROUP, AND COMPRESSOR

CROSS REFERENCE TO RELATED APPLICATIONS

This application is a continuation application of PCT Patent Application No. PCT/CN2014/086056, entitled "Leaf Spring, Leaf Spring Group, and Compressor", filed on Sep. 5, 2014, which claims priority to Chinese Patent Application No. 201310459756.8, entitled "Leaf Spring, Leaf Spring Group, and Compressor", filed on Sep. 30, 2013, the entire contents of which are incorporated herein by reference.

TECHNICAL FIELD

The present disclosure relates to the technical field of springs, more particularly, to a leaf spring, a leaf spring group comprising multiple leaf springs, and a compressor comprising the leaf spring group.

BACKGROUND

The leaf spring supporting technology is one of the most important technologies for a linear compressor. Compared with a traditional cylindrical spring, the leaf spring has the greater radial rigidity, thereby avoiding the radial displacement of the piston caused by the vibration when the piston is moving, further avoiding a direct contact between the piston and the cylinder. What's more, the axial rigidity of the leaf spring is far smaller than the radial rigidity, which enables the piston to move to and fro in the cylinder freely. The patent with the publication No. JP2003247580 (A) discloses a leaf spring with vortex arms, and a patent with the patent No. CN201010248988.5 discloses a leaf spring with linear arms and a leaf spring with vortex arms. The leaf springs with vortex arms disclosed in the two patents have problems as follows: the equivalent mass of the leaf spring is too large, and the mass of the components have to be increased in order to meet the rigidity and inherent frequency requirements.

SUMMARY OF THE INVENTION

The present disclosure aims to provide a leaf spring, which has smaller equivalent mass. What's more, the present disclosure further provides a leaf spring group comprising multiple leaf springs mentioned, and a compressor comprising the leaf spring group.

The technical schemes of the present disclosure are as follows:

A leaf spring comprises at least two spring arms and an inner fixing hole; the at least two spring arms are evenly distributed around a center of the inner fixing hole; each spring arm is of same structure; and an outer fixing hole is disposed at an outermost end of each spring arm.

In one of the embodiments, each spring arm is contoured by multiple pairs of concentric circular arcs, adjacent circular arcs are tangent to each other; radii of the multiple pairs of concentric circular arcs increase gradually from inside to outside; a tail end of the spring arm is contoured by a pair of concentric circular arcs with the largest radii and a circular arc which is concentric with the outer fixing hole; and the circular arc concentric with the outer fixing hole is tangent to both of the concentric circular arcs.

In one of the embodiments, the radii of the multiple pairs of concentric circular arcs increase from 1 mm to 500 mm.

In one of the embodiments, an arm width of the spring arm is ranged from 5 mm to 50 mm.

In one of the embodiments, each spring arm is contoured by two concentric vortex lines, that is, a first vortex line and a second vortex line; a start end of the spring arm is contoured by connecting start ends of the first vortex line and the second vortex line with circular arcs which are concentric with the inner fixing hole; a tail end of the spring arm is contoured by two or three segments of circular arcs and two concentric vortex lines, and the segments of circular arcs are tangent to the two concentric vortex lines; and a circular arc at the outermost tail end is concentric with the outer fixing hole.

In one of the embodiments, via a first circular arc and a second circular arc, start ends of the two concentric vortex lines are respectively connected to the circular arc which is concentric with the inner fixing hole; two ends of the first circular arc are respectively tangent to the first vortex line and the circular arc which is concentric with the inner fixing hole; and two ends of the second circular arc are respectively tangent to the second vortex line and the circular arc which is concentric with the inner fixing hole.

In one of the embodiments, the two concentric vortex lines meet equations:

$x(t)=a*[\cos(t)+t*\sin(t)]$, $Y(t)=a*[\sin(t)-t*\cos(t)]$; and a. $x(t)=(a+b)*[\cos(t)+(t+\alpha)*\sin(t)]$ $y(t)=(a+b)*[\sin(t)-(t+\alpha)*\cos(t)]$;

wherein, X, Y, x, and y are coordinate values, a and a+b are coefficients of radius, t is a variable, α is an initial angle, and $0.5 \le a \le 30$, $0 \le b \le 10$, $0 \text{ rad} \le t \le 30 \text{ rad}$, and $0 \text{ rad} < \alpha \le 150 \text{ rad}$.

In one of the embodiments, a thickness of the leaf spring is ranged from 0.1 mm to 5 mm; and a ratio of the largest outer radius to the thickness is ranged from 5 to 5000.

In one of the embodiments, an arm width of each spring arm is constant.

In one of the embodiments, an arm width of each spring arm increases gradually from inside to outside; and a ratio of maximum arm width to minimum arm width is greater than 1, and less than or equals to 10.

The present disclosure further provides a leaf spring group comprising at least two leaf springs mentioned above; a gasket is arranged between the leaf springs.

The present disclosure further provides a compressor comprising the leaf spring group mentioned above.

The leaf spring provided by the present disclosure has a structure of multiple concentric circular arms or a structure of concentric vortex arms, and the leaf spring has smaller equivalent mass, so that the rigidity and inherent frequency requirements are met without the need of increasing the mass of the components, thereby reducing the product mass and saving the cost. The leaf spring group provided by the present disclosure comprises multiple leaf springs stacked together, which can enhance the rigidity between the components which move relatively to each other. The compressor provided by the present disclosure comprises the leaf spring group, thereby enhancing the rigidity between the components which move relatively to each other, and reducing the product mass.

DETAILED DESCRIPTION OF THE PREFERRED EMBODIMENTS

Figure 1:
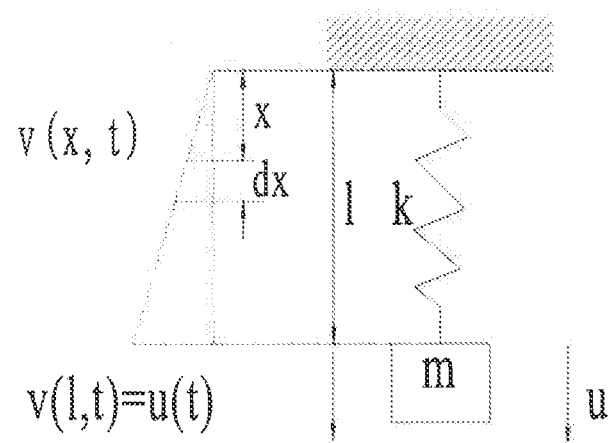
FIG. 1 is a structural schematic diagram of a spring vibration system.

Firstly, the equivalent mass of a leaf spring is explained as follows:

In the spring vibration system as shown in FIG. 1, let the mass of the spring be $m_s$, the length of the spring in static balance be $l$, and the displacement of the end of the spring in vibration be $u(t)$. According to a conclusion in material mechanics that the static tension/compression displacement of a straight rod has a linear distribution, it can be considered that the vibration displacement of the spring also has a linear distribution, so the displacement of the spring's cross-section with a coordinate x is $$v(x, t) = \frac{x}{l} u(t).$$

The mass of the spring segment with the length dx is $m_s dx/l$, so the kinetic energy of the spring is $$T_s = \int_0^l \frac{1}{2} \frac{m_s}{l} v^2(x, t) dx = \frac{1}{2} \frac{m_s}{3} u(t)^2,$$

and the kinetic energy of the whole system is $$T = \frac{1}{2} \left( m + \frac{m_s}{3} \right) u(t)^2.$$

The reference kinetic energy of the whole system is $$T_{ref} = \frac{1}{2} \left( m + \frac{m_s}{3} \right) a^2,$$

and $T_{max} = \omega_n^2 T_{ref}$, the maximum potential energy of the whole system is $$V_{max} = \frac{1}{2} k a^2.$$

According to the law of conservation of mechanical energy, we can get $T_{max} = V_{max}$, further get $$\omega_n^2 = \frac{V_{max}}{T_{ref}},$$

wherein, $\alpha$ is the extension of the spring, k is the stiffness coefficient of the spring, $\omega_n$ is the vibration frequency of the spring. It can be obtained that $$\omega_n = \sqrt{\frac{V_{max}}{T_{ref}}} = \sqrt{\frac{k}{m + m_s/3}}.$$

When m=0, then $$\omega_d = \frac{1}{2\pi} \sqrt{\frac{k}{m_s/3}} = \frac{1}{2\pi} \sqrt{\frac{k}{m_E}},$$

wherein $m_E$ is the equivalent mass of the spring in the vibration system, $\omega_d$ is the inherent frequency of the spring. As for a leaf spring, for the same reason, the equivalent mass of the leaf spring is $$m_E = \frac{k}{(2\pi \omega_d)^2}.$$

By analyzing the leaf spring model through CAE simulation, we can obtain the axial rigidity k and the inherent frequency $\omega_d$ of the axial vibration of the leaf spring, and further obtain the equivalent mass of the leaf spring in the whole vibration system.

As can be known from the above, the equivalent mass of the leaf spring is determined by the actual structure of the leaf spring, i.e., by the inherent frequency and the axial rigidity of the leaf spring. It is preferable that the ratio of the equivalent mass $m_E$ of the leaf spring to the mass $m_s$ of the leaf spring is as small as possible. The ratio for the leaf spring in the prior art, which comprises concentric vortex arms with the equal arm width, is about 50%, whereas the ratio for the leaf spring comprising eccentric vortex arms is larger. The present invention aims at reducing the ratio $m_E/m_s$ to the range from 25% to 50% by reducing the relative material amount in the intermediate region of the leaf spring.

Figure 2:
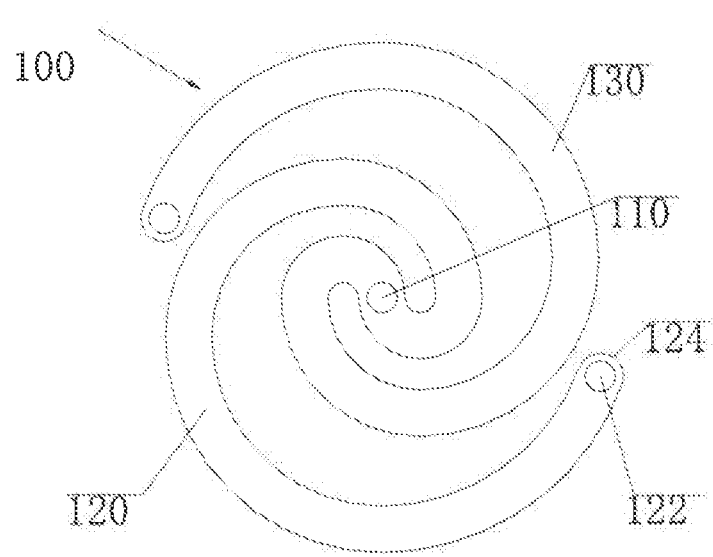
FIG. 2 is a structural schematic diagram of the leaf spring according to the first embodiment of the present invention.
Figure 3:
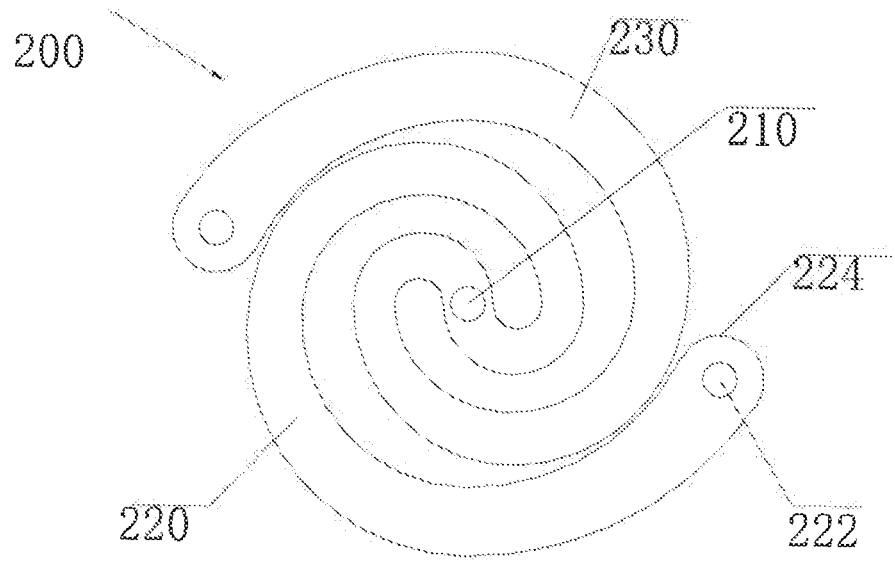
FIG. 3 is a structural schematic diagram of the leaf spring according to the second embodiment of the present invention.
Figure 4:
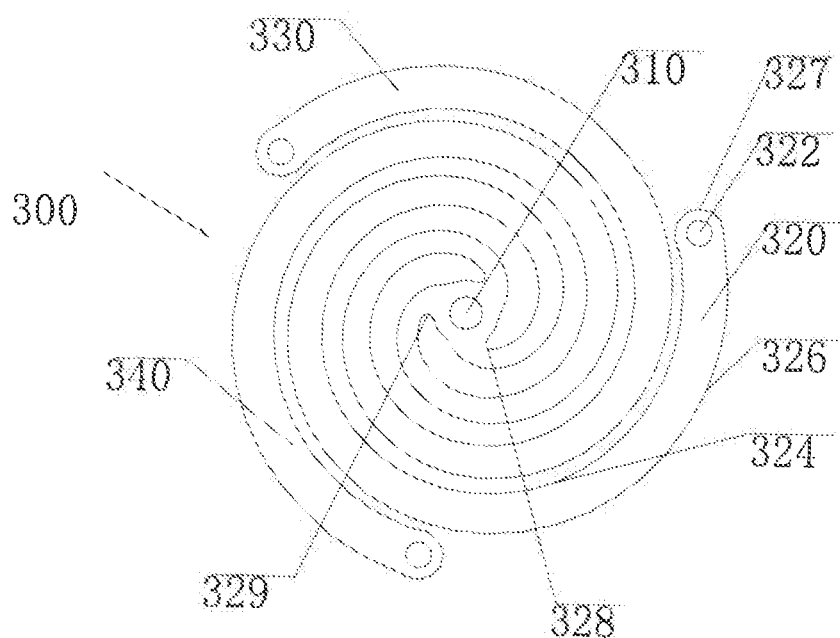
FIG. 4 is a structural schematic diagram of the leaf spring according to the third embodiment of the present invention.
Figure 5:
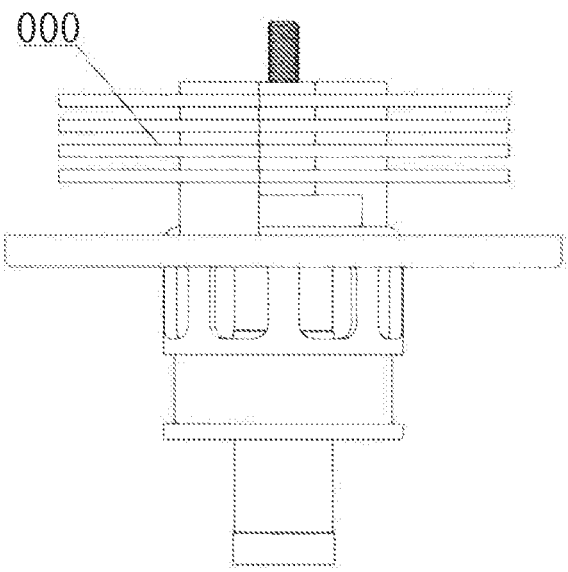
FIG. 5 is a plane view of the compressor according to one embodiment of the present invention.
Figure 6:
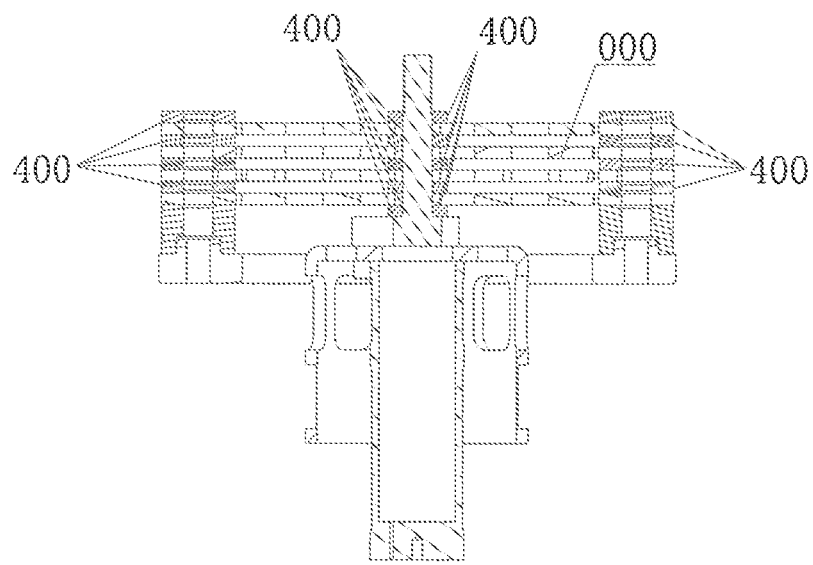
FIG. 6 is a plane sectional view of the compressor of FIG. 5.
Figure 7:
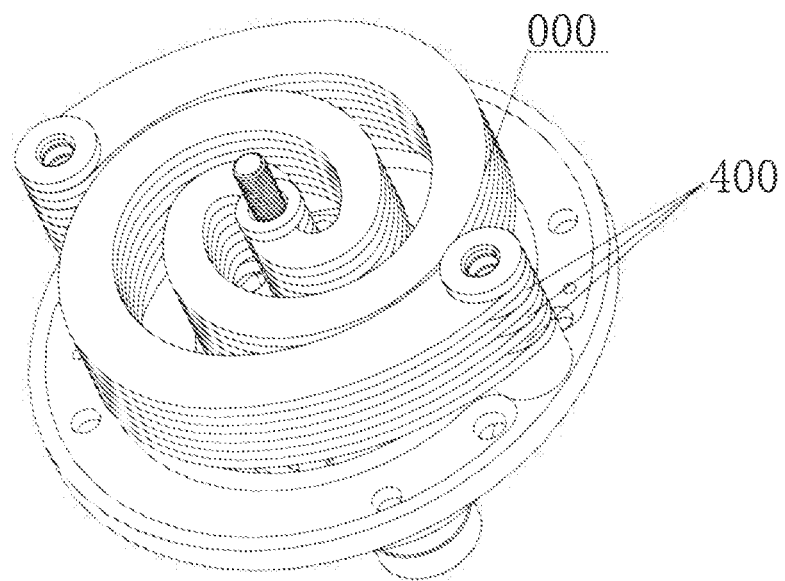
FIG. 7 is a top view of the compressor of FIG. 5.
Figure 8:
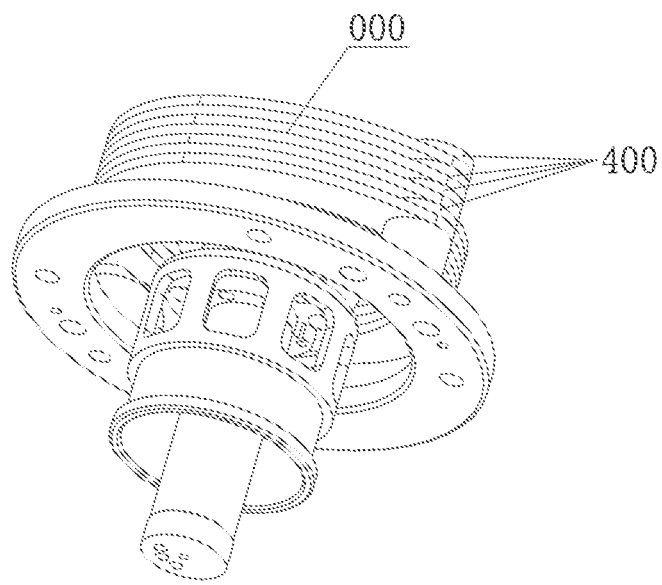
FIG. 8 is a lateral view of the compressor of FIG. 5.
Figure 9:
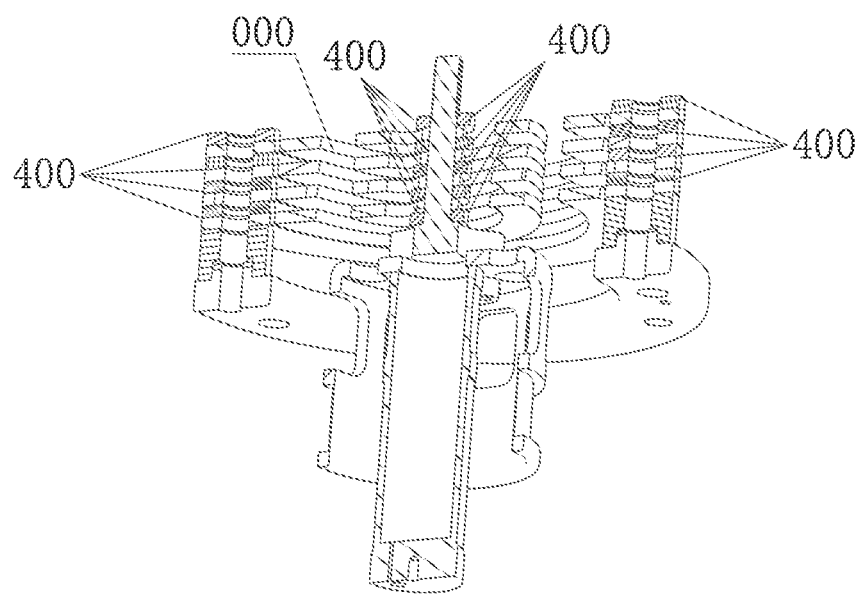
FIG. 9 is a stereo sectional view of the compressor of FIG. 5.

As shown in FIGS. 2-4, the present disclosure provides a leaf spring, comprising at least two spring arms and an inner fixing hole. All spring arms are evenly distributed around a center of the inner fixing hole. Each spring arm is of the same structure, and an outer fixing hole is provided at an outermost end of each spring arm.

Preferably, the number of the spring arms may be two or three; the leaf spring may be a spring having equal or unequal arm width; the spring arm may be contoured with circular arcs or vortex lines; which will be respectively described below:

The First Embodiment

FIG. 2 illustrates the leaf spring according to the first embodiment of the present invention. The leaf spring comprises multiple concentric circular arms with equal arm width. The leaf spring 100 comprises the inner fixing hole 110, the spring arms 120 and 130. The spring arms 120 and 130 are evenly distributed around the center of the inner fixing hole 110. The spring arms 120 and 130 are of the same structure. The leaf spring 100 will be illustrated with reference to the spring arm 120 as follows:

The outer fixing hole 122 is disposed in the spring arm 120 to fix the leaf spring 100. The spring arm 120 is contoured by multiple pairs of concentric circular arcs, wherein adjacent circular arcs are tangent to each other. As shown in FIG. 2, from inside to outside, radii of the multiple pairs of concentric circular arcs gradually increase, for example, from 1 mm to 500 mm. The tail end of the spring arm 120 is contoured by the circular arc 124 and the pair of concentric circular arcs with the largest radii, and the circular arc is tangent to both of the concentric circular arcs. The circular arc 124 and the outer fixing hole 122 are concentric, and the diameter of the circular arc 124 is equal to the arm width of the spring arm 120 (the radius difference between the radii of each pair of concentric circular arcs forms the arm width of the spring arm). In this embodiment, the arm width of the spring arm 120 is constant. Preferably, the arm width of the spring arm 120 is ranged from 5 mm to 50 mm, and the thickness of the leaf spring 100 is ranged from 0.1 mm to 5 mm, so the ratio of the largest outer radius to the thickness is ranged from 5 to 5000.

The Second Embodiment

FIG. 3 illustrates the leaf spring according to the second embodiment of the present invention. The leaf spring comprises multiple concentric circular arms with unequal arm width. The leaf spring 200 comprises the inner fixing hole 210, the spring arms 220 and 230. The spring arms 220 and 230 are evenly distributed around the center of the inner fixing hole 210. The spring arms 220 and 230 are of the same structure. The leaf spring 200 will be illustrated with reference to the spring arm 220 as follows:

The outer fixing hole 222 is disposed in the spring arm 220 to fix the leaf spring 200. The spring arm 220 is contoured by multiple pairs of concentric circular arcs, wherein adjacent circular arcs are tangent to each other. As shown in FIG. 3, from inside to outside, radii of the multiple pairs of concentric circular arcs gradually increase, for example, from 1 mm to 500 mm. The tail end of the spring arm 220 is contoured by the circular arc 224 and the pair of concentric circular arcs with the largest radii, and the circular arc is tangent to both of the pair of concentric circular arcs. The circular arc 224 and the outer fixing hole 222 are concentric. The arm width of the spring arm 220 is not constant and increases gradually from inside to outside. The ratio of the maximum arm width to the minimum arm width is greater than 1, and less than or equals to 10. Preferably, the arm width of the spring arm 220 is ranged from 5 mm to 50 mm, the thickness of the leaf spring 100 is ranged from 0.1 mm to 5 mm, so the ratio of the largest outer radius to the thickness is ranged from 5 to 5000.

The Third Embodiment

FIG. 4 illustrates the leaf spring according to the third embodiment of the present invention. The leaf spring comprises concentric vortex arms with unequal arm width. The leaf spring 300 comprises the inner fixing hole 310 and the spring arms 320, 330 and 340. Three spring arms are evenly distributed around the center of the inner fixing hole 310. The spring arms 320, 330 and 340 are of the same structure. The leaf spring 300 will be illustrated with reference to the spring arm 320 as follows:

The outer fixing hole 322 is disposed in the spring arm 320. The spring arm 320 is contoured by two concentric vortex lines, namely, the first vortex line 324 and the second vortex line 326. The start end of the spring arm 320 is contoured by connecting the start ends of the first vortex line 324 and the second vortex line 326 with the circular arcs which are concentric with the inner fixing hole 310. Preferably, the first vortex line 324 is connected, via a first circular arc 328, to a circular arc which is concentric with the inner fixing hole 310. Two ends of the first circular arc 328 are respectively tangent to the start end of the first vortex line 324 and the circular arc which is concentric with the inner fixing hole 310. The second vortex line 326 is connected, via a second circular arc 329, to the circular arc which is concentric with the inner fixing hole 310. Two ends of the second circular arc 329 are respectively tangent to the start end of the second vortex line and the circular arc which is concentric with the inner fixing hole 310. The tail end of the spring arm 320 is contoured by two or three segments of circular arcs and the vortex lines 324 and 326, and the segments of circular arcs are tangent to the vortex lines. The circular arc 327 at the outermost tail end is concentric with the outer fixing hole. The first vortex line 324 and the second vortex line 326 respectively meet the following equations:

$$X(t)=a*[\cos(t)+t*\sin(t)],$$

$$Y(t)=a*[\sin(t)-t*\cos(t)]; \text{ and the equations}$$

$$x(t)=(a+b)*[\cos(t)+(t+\alpha)*\sin(t)],$$

$$y(t)=(a+b)*[\sin(t)-(t+\alpha)*\cos(t)];$$

Wherein, X, Y, x, and y are coordinate values, a and a+b are coefficients of radius, t is a variable, α is an initial angle, and $0.5 \leq a \leq 30$, $0 \leq b \leq 10$, $0 \text{ rad} < t \leq 30 \text{ rad}$, and $0 \text{ rad} < \alpha \leq 150 \text{ rad}$.

As shown in FIG. 4, the arm width of the spring arm 320 increases gradually from inside to outside, and the ratio of the maximum arm width to the minimum arm width is greater than 1, and less than or equals to 10. The thickness of the leaf spring 300 is ranged from 0.1 mm to 5 mm, so the ratio of the largest outer radius to the thickness is ranged from 5 to 5000.

The leaf spring provided by the present disclosure has a structure of multiple concentric circular arms or a structure of concentric vortex arms, and the leaf spring has smaller equivalent mass (25%~50%), so that the rigidity and the inherent frequency requirements are met without the need of increasing mass of the components, thereby reducing the product mass and saving the cost. What's more, under the conditions of the same outer radius, the leaf spring with the structure of the present disclosure has a larger linear working range, which is beneficial for making the leaf spring compact in structure.

The present disclosure further provides a leaf spring group 000, which comprises at least two leaf springs mentioned above. Multiple leaf springs mentioned above are stacked together, which can enhance the rigidity between the components which move relatively to each other. Preferably, gaskets 400 are arranged between two adjacent leaf springs.

As shown in FIG. 5-9, the present invention further provides a compressor, which comprises the leaf spring group 000 above. The gaskets 400 with certain thickness and shape are arranged between the leaf springs of the leaf spring group 000. Preferably, the gasket 400 is arranged at the position where the leaf spring group is fixed. On one hand, the gaskets 400 reduce the concentrated stress acting on the position where the leaf spring group 000 is fixed; on the other hand, the gaskets prevent the friction and abrasion between adjacent leaf springs, and prolong the service life of the leaf spring group 000.

What described above are several embodiments of the present invention, and they are specific and in details, but not intended to limit the scope of the present invention. It will be understood by those skilled in the art that various modifications and improvements can be made without departing from the conception of the present disclosure, and all these modifications and improvements are within the scope of the present invention. Therefore, the scope of the present invention should be subject to the claims attached.

What is claimed is:

1. A leaf spring comprising:
    at least two spring arms, each spring arm of same structure;
    an inner fixing hole, the at least two spring arms evenly distributed around a center of the inner fixing hole; and
    an outer fixing hole disposed at an outermost end of each spring arm;
    wherein each of the at least two spring arms is contoured by two concentric vortex lines, a first vortex line and a second vortex line; a start end of each spring arm is contoured by connecting start ends of the first vortex line and the second vortex line with circular arcs which are concentric with the inner fixing hole; a tail end of each spring arm is contoured by two or three segments of circular arcs and two concentric vortex lines, and the segments of circular arcs are tangent to the two concentric vortex lines; and a circular arc at the outermost tail end is concentric with the outer fixing hole;
    the two concentric vortex lines respectively meet equations:

$X(t)=a*[\cos(t)+t*\sin(t)]$, $Y(t)=a*[\sin(t)-t*\cos(t)]$; and $x(t)=(a+b)*[\cos(t)+(t+\alpha)*\sin(t)]$ $y(t)=(a+b)*[\sin(t)-(t+\alpha)*\cos(t)]$;

wherein, X, Y, x, and y are coordinate values, a and a+b are coefficients of radius, t is a variable, α is an initial angle, and 0.5≤a≤30, 0<b≤10, 0 rad<t≤30 rad, and 0 rad<α≤150 rad.

2. The leaf spring according to claim 1, wherein, via a first circular arc and a second circular arc, start ends of the two concentric vortex lines are respectively connected to the circular arc which is concentric with the inner fixing hole; two ends of the first circular arc are respectively tangent to the first vortex line and the circular arc which is concentric with the inner fixing hole; and two ends of the second circular arc are respectively tangent to the second vortex line and the circular arc which is concentric with the inner fixing hole.

3. The leaf spring according to claim 1, wherein, a thickness of the leaf spring is ranged from 0.1 mm to 5 mm; and a ratio of the largest outer radius to the thickness is ranged from 5 to 5000.

4. A leaf spring group, comprising at least two leaf springs as defined in claim 1, wherein, a gasket is arranged between the leaf springs.

5. A compressor, comprising the leaf spring group as defined in claim 4.

6. The leaf spring according to claim 2, wherein, a thickness of the leaf spring is ranged from 0.1 mm to 5 mm; and a ratio of the largest outer radius to the thickness is ranged from 5 to 5000.

7. The leaf spring according to claim 1, wherein, a thickness of the leaf spring is ranged from 0.1 mm to 5 mm; and a ratio of the largest outer radius to the thickness is ranged from 5 to 5000.

8. The leaf spring group according to claim 7, wherein, each spring arm is contoured by two concentric vortex lines, that is, a first vortex line and a second vortex line; a start end of the spring arm is contoured by connecting start ends of the first vortex line and the second vortex line with circular arcs which are concentric with the inner fixing hole; a tail end of the spring arm is contoured by two or three segments of circular arcs and two concentric vortex lines, and the segments of circular arcs are tangent to the two concentric vortex lines; and a circular arc at the outermost tail end is concentric with the outer fixing hole.

9. A compressor, comprising the leaf spring group as defined in claim 7.

* * * * *

UNITED STATES PATENT AND TRADEMARK OFFICE
CERTIFICATE OF CORRECTION

| | | |
|---|---|---|
| PATENT NO. | : 9,810,278 B2 | Page 1 of 1 |
| APPLICATION NO. | : 15/026012 | |
| DATED | : November 7, 2017 | |
| INVENTOR(S) | : Hui Huang et al. | |

It is certified that error appears in the above-identified patent and that said Letters Patent is hereby corrected as shown below:

Please correct the dependency of Claim 6 to claim 1.

Signed and Sealed this
Second Day of January, 2018

Joseph Matal
*Performing the Functions and Duties of the*
*Under Secretary of Commerce for Intellectual Property and*
*Director of the United States Patent and Trademark Office*